Fig. 5.

Jan. 20, 1948. T. TRECKER ET AL 2,434,750
MACHINE TOOL
Filed Dec. 30, 1941 10 Sheets-Sheet 9

INVENTORS:
THEODORE TRECKER,
JOSEPH B. ARMITAGE, KURT A. RIEDEL
ORRIN W. BARKER & F. DONALD BOEHMER
BY: W. D. O'Connor
ATTORNEY.

Patented Jan. 20, 1948

2,434,750

UNITED STATES PATENT OFFICE 2,434,750

MACHINE TOOL

Theodore Trecker, Milwaukee, Joseph B. Armitage, Wauwatosa, and Orrin W. Barker, Kurt A. Riedel, and Francis Donald Boehmer, Milwaukee, Wis., assignors to Kearney & Trecker Corporation, West Allis, Wis., a corporation of Wisconsin Application December 30, 1941, Serial No. 424,934

10 Claims. (Cl. 90—18)

This invention relates, generally, to improvements in machine tools and more particularly to an improved milling machine especially adapted to execute a multiplicity of machining operations simultaneously.

A general object of the invention is to provide an improved milling machine capable of completing a plurality of machining operations upon a work piece in a single traverse of the work piece through the machine.

Another object is to provide improved means for removing chips from the zone of operation of a milling cutter.

Another object is to provide a milling machine having power actuated means for removing chips from the region of a milling cutter, together with control means arranged to prevent feeding movement of the machine when the chip removing apparatus is not operating.

Another object is to provide a milling machine having a table driving motor and a plurality of spindle driving and auxiliary motors, together with a control system operative to stop the table driving motor upon the occurrence of an overload in any of the motors.

According to this invention, a milling machine for performing a multiplicity of machining operations simultaneously, is provided with a plurality of primary and secondary cutter gangs arranged in tandem relationship, together with means for removing chips from the paths of the secondary cutters and control means for correlating the feeding movement with the operation of the cutters and the chip removing apparatus. In a preferred embodiment, the machine is in the form of a modified rail type milling machine having a long table supporting bed with an upright disposed at each side. The main spindle carrying head is mounted for vertical adjustment on one of the uprights and has fixed to it one end of a cross rail the other end of which is fixed to a saddle that is slidably mounted on the other upright. The primary function of the machine is to form T-slots in machine tool tables, the main spindle head being provided with a horizontal spindle, carrying primary cutters arranged to effect preliminary slotting operations in the top of the work piece. For completing the slots, secondary T-slotting cutters are carried by a vertical spindle head that is adjustably mounted on the cross rail in position to take successive finishing cuts in the slots. For operating on the side or front of the table, a third spindle head carrying both primary and secondary cutters is adjustably mounted on the main upright. To insure unobstructed operation of the secondary cutters, suction apparatus is provided for removing chips from the preliminary slots formed by the primary cutters. The control system for the driving motors includes means preventing feeding movement unless the motor driving the chip removing suction apparatus is in operation. The control further prevents feeding movement unless one or more of the spindle driving motors is energized, while permitting operation of the work table at rapid traverse rate independently of the suction motor or the spindle motors. Overload protection is provided for stopping the feeding movement upon the occurrence of a continuing overload in any of the motors, and additional instantaneous overload protection is arranged to stop the table motor instantly upon the occurrence of a sudden overload in any one of the spindle motors.

The invention is exemplified in this specification by means of a large milling machine of modified rail type. However, it is to be understood that this particular embodiment of the invention is intended to be illustrative only and that various other embodiments, all within the range of equivalents of the characteristics defined in the subjoined claims, may be utilized by those skilled in the art in practicing various features of the invention.

The foregoing and other objects of this invention, which will become more fully apparent from the following detailed description, may be achieved by means of the exemplifying apparatus depicted in, and set forth in this specification in connection with, the accompanying drawing, in which.

The particular machine tool shown in the accompanying drawing as exemplifying a preferred embodiment of the invention, is a large milling machine of modified rail type, although it is to be understood that various features of the invention may be utilized to advantage in other machine tools of different construction. The milling machine illustrated is especially adapted to perform a plurality of machining operations simultaneously in manner to completely machine a work piece in a single operation. To this end, successive cuts are taken by cutters arranged in tandem relationship to complete a series of machining operations in a single traverse of the work piece relative to the cutters. The particular type of work for which this machine is especially designed is that of completely machining T-slots in the tops and sides of work supporting tables for macihne tools. In this operation it is necessary that the several T-slots be formed accurately within close tolerances and that the relative positions of the slots be maintained with an equally high degree of accuracy.

Figure 1:
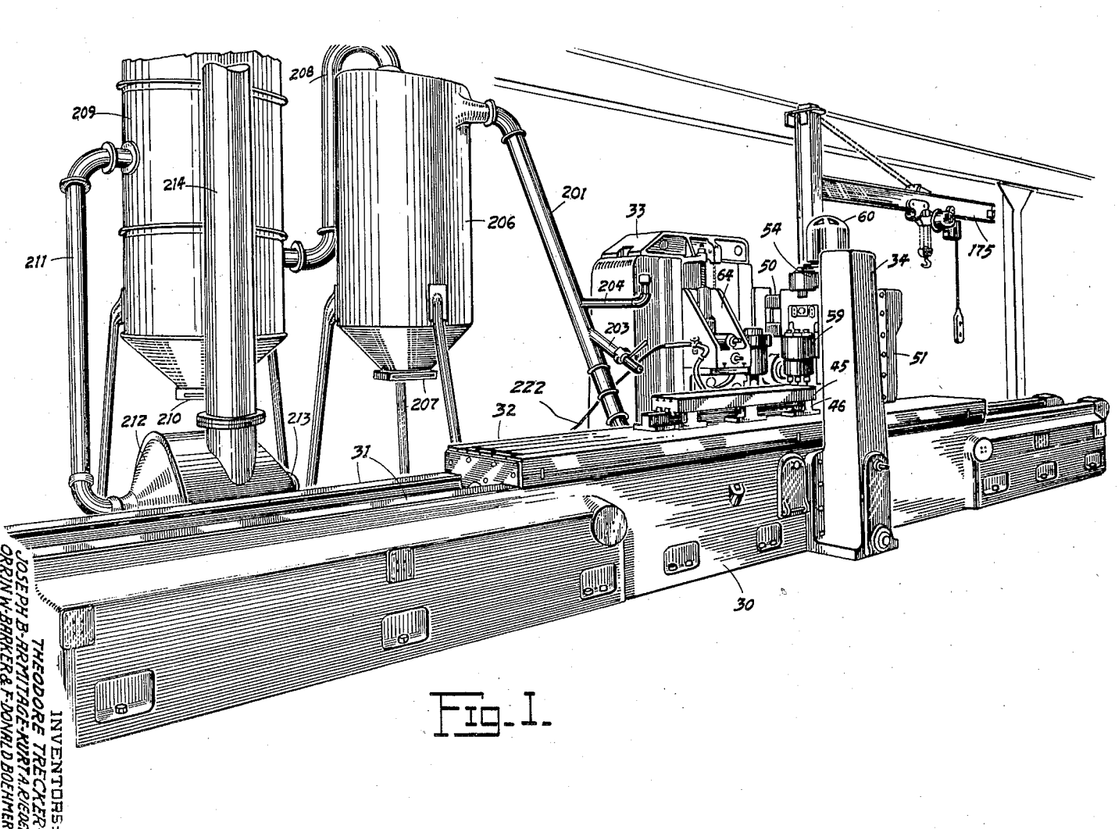
Figure 1 is a general view in perspective of a large milling machine exemplifying the type of apparatus in which the present invention may be incorporated to advantage.

Referring more specifically to the drawing, and particularly to Figure 1 thereof constituting a general view of the machine embodying the present invention, it will be seen that the structure comprises essentially a relatively long and heavy base or bed 30 that constitutes the foundation or main frame of the machine and forms a housing for some of its actuating mechanism. On the upper surface of the bed 30, a pair of ways 31 are formed for slidably supporting a heavy work carrying table or work support 32 that is arranged for longitudinal feeding movement along the ways in the usual manner.

Figures 2, 3:
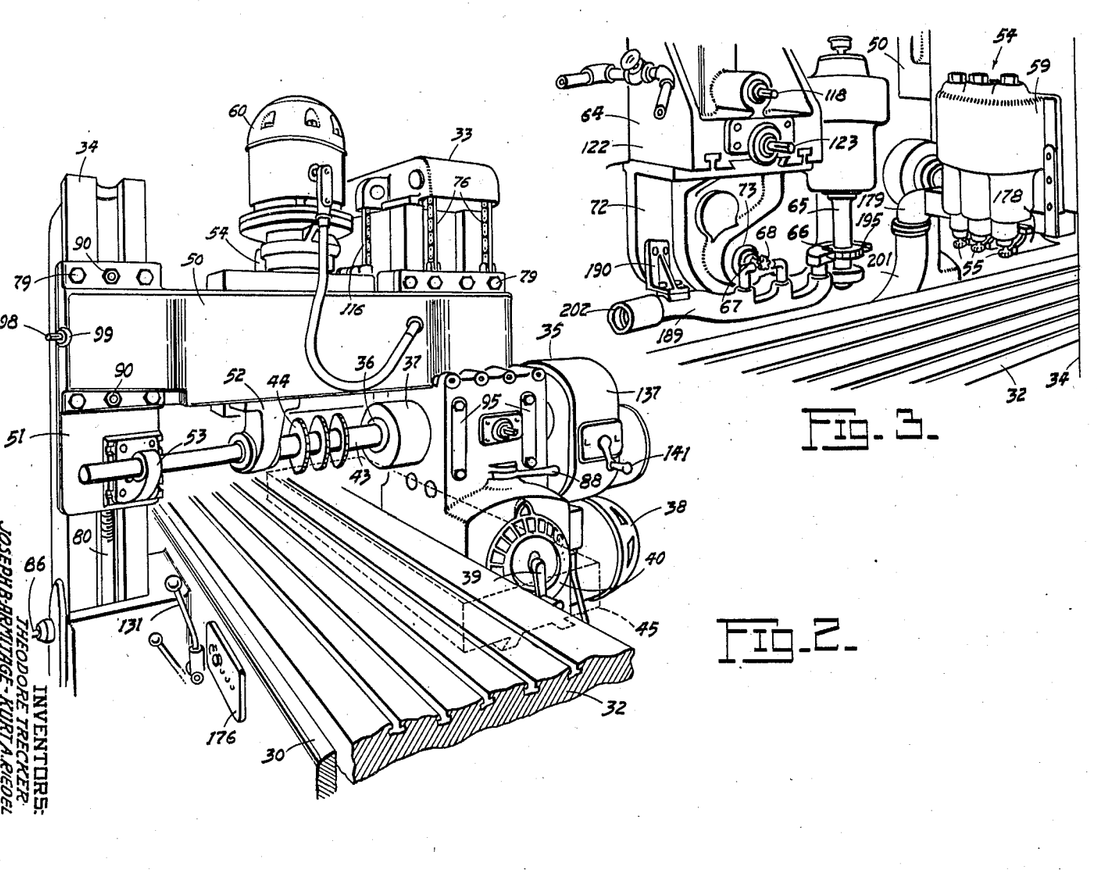
Fig. 2 is another view in perspective showing part of the milling machine, as seen from the far end in Fig. 1.
Fig. 3 is an enlarged view in perspective of the cutter supporting spindle heads of the machine, as shown in Fig. 1.

For supporting milling cutters in cooperating relationship with the work table 32, the machine is provided midway of its length with a rear or main upright or column 33 and a front or secondary upright or column 34 disposed at and secured to the respective sides of the bed 30. As best shown in Fig. 2, the rear upright 33 has slidably mounted thereon for vertical adjustment, a large spindle supporting head 35 which carries a horizontally disposed main or primary spindle 36 rotatably mounted in a heavy quill 37 that is arranged for longitudinal sliding adjustment. The main spindle 36 is driven by a main spindle electric motor 38 that is carried by the sliding head 35 and is operatively connected to turn the spindle 36 at desired speed, suitable speed changing mechanism being housed within the head 35 and arranged for adjustment by means of an adjusting lever or crank 39 which cooperates with an indicating dial 40 on the side of the head.

As shown in Fig. 2, the main spindle 36 drives an arbor 43 which carries a plurality of primary slotting cutters 44 that are arranged to cut spaced rectangualr preliminary slots in the top of a work piece. For example, the cutters 44 are in this instance arranged to form three equally spaced slots in a machine tool table blank 45 that is supported by means of a suitable clamping fixture 46 on the top of the work table 32.

Associated with the spindle head 35 and movable vertically with it, is a cross rail 50 of heavy construction that is secured at its rearward end to the top of the spindle head and at its forward end to a saddle 51 which is slidably mounted for vertical movement along the front upright 34. The cutter arbor 43 may be rigidly supported at selected positions throughout its length from the rail 50 by means of one or more supporting pendants 52 that may be secured at any desired position along the rail. For further steadying the arbor, its outer end may be supported from the saddle 51 by means of an outboard bearing 53.

Preferably, the main spindle 36 is rotated in a direction to cause the cutters 44 to effect a preliminary climb-cutting operation upon the work piece 45. The spindle carrying quill 37 and the pendants 52 may be adjusted longitudinally in order to adjust the position of the cutters 44 transversely of the work piece. To regulate the depth of the slots being cut by the cutters 44, the entire spindle head 35 together with the connected cross rail 50 and the saddle 51, are adjusted vertically along the uprights 33 and 34.

Figure 4:
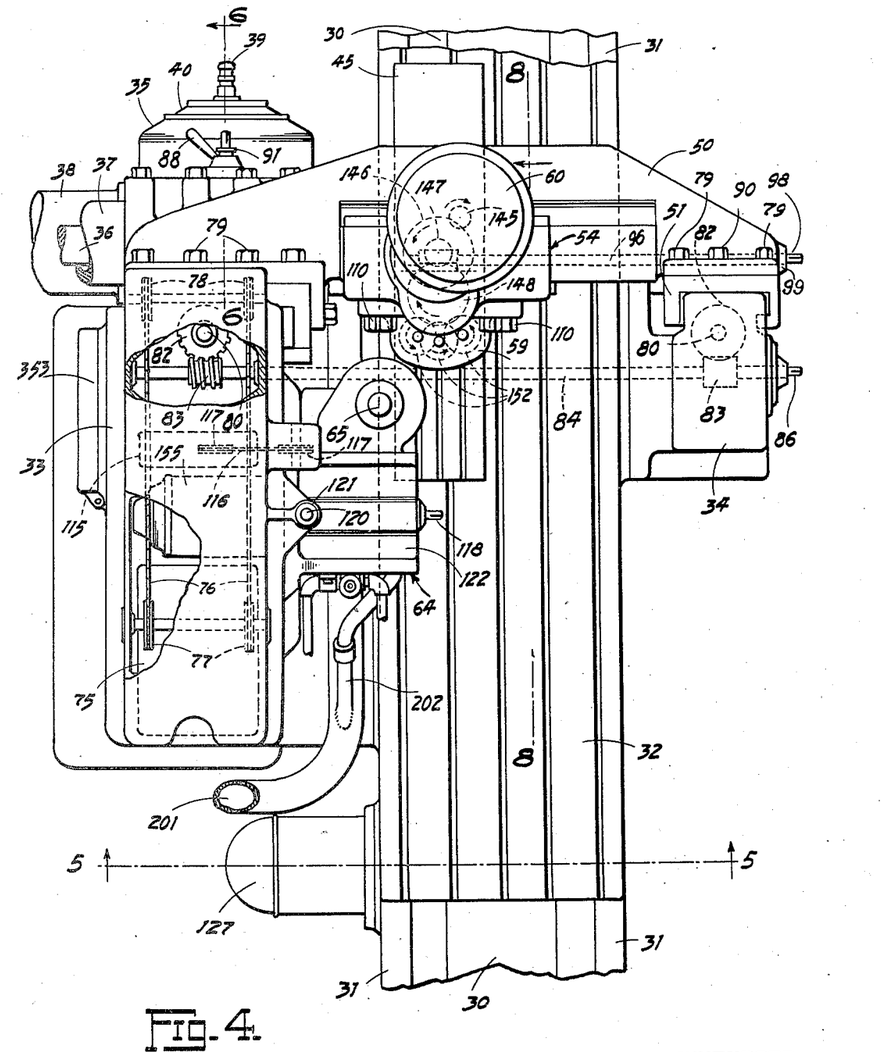
Fig. 4 is a plan view of the machine with parts of the bed broken away.
Figure 5:
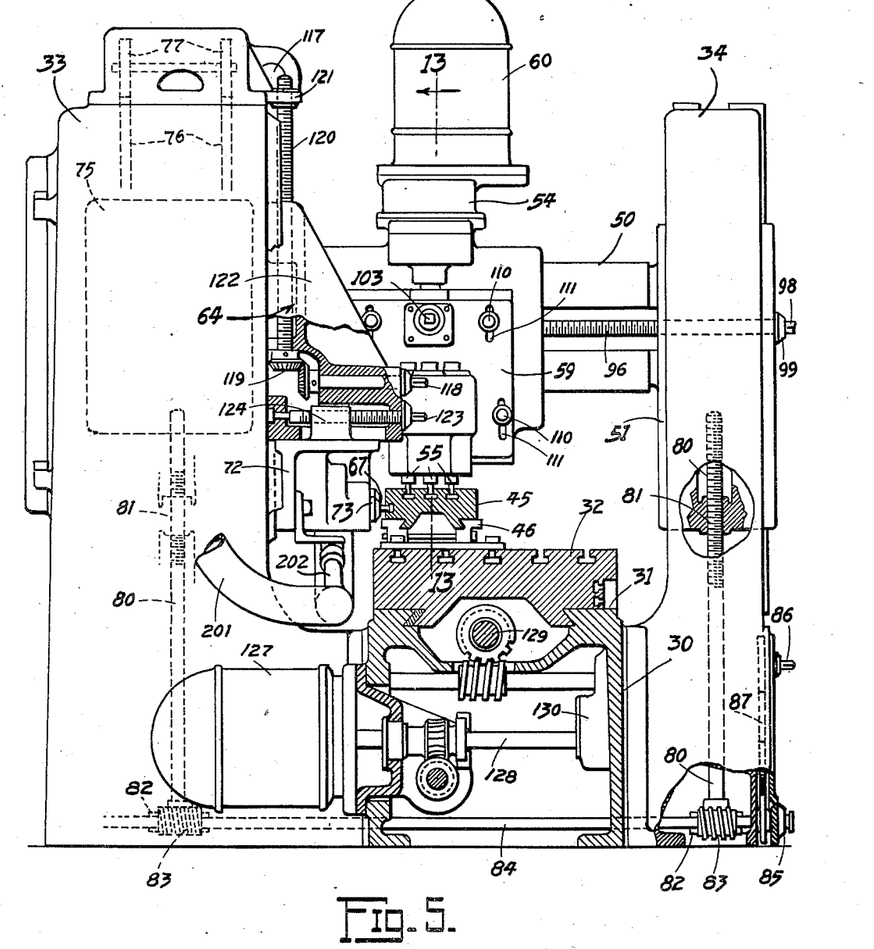
Fig. 5 is a view partly in end elevation and partly in vertical transverse section, taken along the line 5—5 in Fig. 4 with parts broken away to show internal structure.

For completing the T-slots in the top of the work piece 45, there is provided an auxiliary vertical spindle head or cross slide 54 that is adjustably carried by the rail 50, as shown in Figs. 4 and 5, and presents a plurality of spaced vertical secondary spindles 55 each carrying a formed secondary T-slot milling cutter 56 held in its spindle by a draw-in bolt 57. The vertical spindle head 54 is slidably mounted on the rail 50 in a manner to permit it to be moved transversely of the machine for bringing its three finishing cutters 56 respectively into alignment or tandem relationship with the three cutters 44 of the main spindle 36 in order to perform simultaneously successive secondary finishing cuts in the preliminary slots formed by the primary cutters, thereby completing the T-slots. The vertical spindles 55 are carried in a detachable spindle carrying portion 59 of the vertical head 54, the arrangement being such that the part 59 may be removed and replaced by a substitute part in which the spindles 55 are disposed at different center distances to provide for cutting differently spaced slots in the work piece. For correlating the vertical position of the cutters 56 with that of the cutters 44 on the main spindle 36, the vertical spindle carrier 59 is arranged for limited vertical adjustment relative to the head 54. Power for driving the vertical spindles 55 is derived from a motor 60 mounted on the head 54 above the rail 50.

Figure 8:
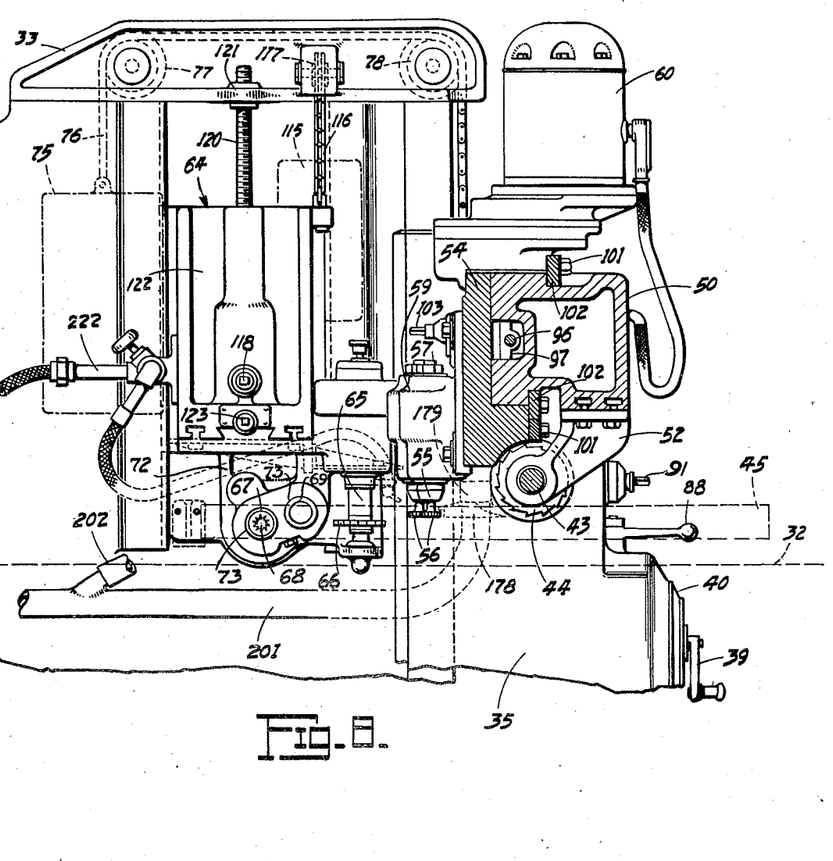
Fig. 8 is a view partly in side elevation and partly in longitudinal section, taken along the line 8—8 in Fig. 4, and showing the relationship of the various milling cutters in the machine.
Figures 12, 13:
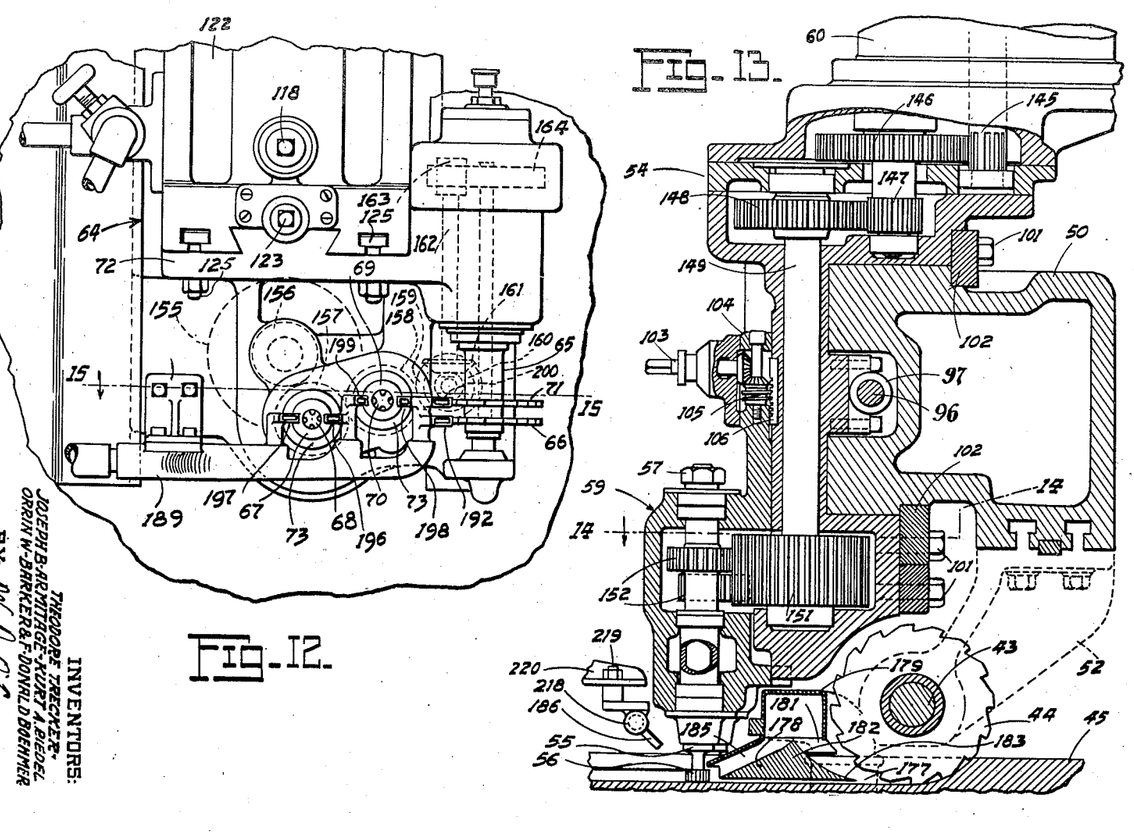
Fig. 12 is an enlarged fragmentary view in elevation of the side spindle head, showing the spindle driving mechanism.
Fig. 13 is an enlarged view in vertical section through the vertical spindle head, taken along the line 13—13 in Fig. 5.

For cutting T-slots in the forward side or apron of the table blank 45 in accurately predetermined position, there is provided a third or side cutting head 64 which is slidably mounted for vertical adjustment on the rear upright 33 independently of the horizontal spindle head 35. As shown in Figs. 3, 8 and 12, the side head 64 carries a vertical spindle 65 that drives a slotting cutter 66 arranged to cut a rectangular preliminary slot in the forward face of the table blank 45. To complete the slot, the head 64 is further provided with a horizontal spindle 67 that supports a formed secondary T-slot cutter 68 in position to follow the rectangular slotting cutter 66. In the event that two T-slots are required in the apron of the table, a second horizontal spindle 69 carrying a T-slot cutter 70 may be brought into use to cooperate with a second slotting cutter 71 on the vertical spindle 65 in spaced relationship with the cutter 66, as shown in Fig. 12.

Adjustment of the vertical position of the side cutters is effected by moving the entire side head 64 vertically along the rear upright 33, and adjustment of the depth of cut effected by the cutters is provided for by moving a cutter carrying portion 72 of the side head 64 horizontally toward or from the work table. The position of the T-slot forming cutters 68 and 70 relative to the slotting cutters 66 and 71 may be adjusted independently, since the spindles 67 and 69 are supported in quills 73 each having a limited degree of in and out movement for adjusting the longitudinal positions of the spindles.

In adjusting the main slotting cutters 44 for regulating the depth of the top T-slots, both the main spindle head 35 and the saddle 51 are moved vertically in unison along the respective uprights 33 and 34. To balance the weight of the main spindle head 35, a suitable counterweight 75 is provided. As shown in Figs. 4 and 8, the counterweight 75 is disposed within the upright 33 and is connected to the ends of two parallely disposed chains 76 which operate over pairs of pulleys 77 and 78 journalled in the top of the rear upright 33 and that are connected at their other ends to the spindle head 35, as shown in Fig. 2, the arrangement being such that the chains pull upward on the head with a force equivalent to the weight of the counterweight 75. As appears in Fig. 6, the cross rail 50 is securely attached to the upper part of the main spindle head 35 and to the saddle 51 by means of bolts 79.

For moving the head 35 and the saddle 51 vertically to adjust the positions of the main spindle 36 and the rail 50, each upright is provided with a vertically disposed elevating screw 80 journalled for rotation therein, the screws being disposed to cooperate with nuts 81 fixed in the head and saddle, respectively. As appears in Figs. 4 and 5, each of the screws 80 is provided at its lower end with a worm wheel 82 that meshes with a cooperating worm 83. Both of the driving worms 83 are fixed on a transverse shaft 84 extending from one side of the machine to the other, the arrangement operating to turn the two vertical feed screws 80 simultaneously for moving both ends of the rail 50 equally. The transverse shaft 84 is provided at its forward end with a micrometer dial 85 by means of which the amount of vertical movement of the spindle carrying structure may be determined. Manual operation of the adjusting mechanism may be effected by applying a crank to the squared end of an actuating shaft 86 that projects from the base of the forward upright 34 at a convenient elevation and is operatively connected to turn the transverse shaft 84 by means of a gear train 87. The spindle head 35 may be rigidly clamped to the upright 33 at the adjusted position by actuating a clamping lever 88 that operates a balanced or equalized clamping mechanism 89 within the upright. Likewise, the saddle 51 may be clamped to the upright 34 by tightening clamping nuts 90 at the top and bottom respectively of the cross rail 50.

Figure 6:
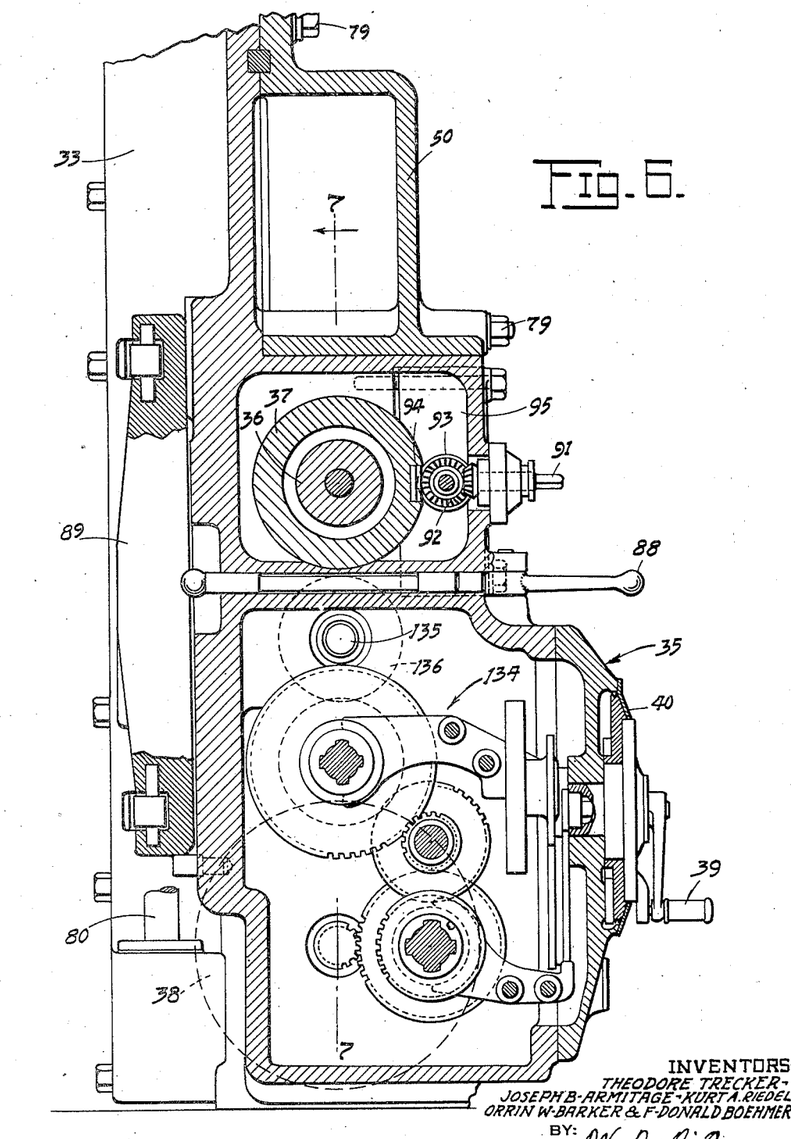
Fig. 6 is an enlarged view in vertical section through the cross rail and main spindle head, taken along the line 6—6 in Figs. 4 and 7.

Adjustment of the cutters 44 transversely of the work piece 45 is effected by moving the quill 37 in or out of the spindle head 35 by applying a crank or the like to the squared end of an actuating shaft 91, shown in Fig. 6, which is connected by beveled gearing 92 to turn a spiral pinion or worm 93 that cooperates with a rack 94 fixed in the side of the quill 37. The quill 37 is then clamped in the adjusted position by tightening quill clamping devices 95 at each end of the head 35.

Transverse adjustment of the vertical spindle head 54 along the rail 50 is effected by means of a screw 96 journalled in the rail as shown in Fig. 5 and cooperating with a nut 97 fixed on the body of the spindle head 54, as shown in Fig. 8. The screw 96 may be rotated by means of a crank or the like applied to the squared end 98 thereof which projects at the front of the machine and is provided with a micrometer dial 99 for showing the amount of adjustment. After adjustment, the head 54 may be locked in position by tightening clamping bolts 101 which act upon gibs 102 to clamp the head to the rail.

Vertical adjustment of the vertical spindle carrying element 59 relative to the rail 50 is effected by means of a crank or the like applied to the squared end of an actuating shaft 103 which is connected by beveled gearing 104, shown in Fig. 13, to turn a worm 105 that engages a rack 106 fixed in the head 54, the arrangement being such that the spindle carrier 59 may be adjusted vertically a sufficient distance to compensate for changes resulting from resharpening the cutters 44 or the like.

As shown in Fig. 5, the spindle carrying element 59 is secured to the spindle head 58 by means of four clamping bolts 110 which pass through slots 111 in the carrier 59 to provide for the vertical adjusting movement, the bolts 110 being tightened after adjustment to lock the spindle carrier 59 to the head 54 in the adjusted position.

The entire side cutting head 64 is counterbalanced by means of a counterweight 115, shown in Figs. 4 and 8, that is connected to the head by means of a chain 116 operating over pulleys 117 in the top of the rear column 33. Vertical adjustment of the side head may be effected by means of a crank applied to the squared end of an actuating shaft 118 which operates through bevel gearing 119 Fig. 5, to turn a screw 120 in a nut 121 fixed in the top of the column 33, to move the head vertically along the column. The slide engaging or supporting portion of the side head 64 comprises an inverted bracket element 122 from which the spindle carrying portion 72 is suspended for sliding movement toward or from the upright 33. As shown in Fig. 5, in and out movement of the unit 72 may be effected by means of a crank applied to the squared end of screw shaft 123 journalled in the bracket 122 that cooperates with a nut 124 on the unit 72 to effect adjustment of the side cutter spindles toward or from the work. This adjustment is utilized to establish the depth of cut of the slotting cutters 66 and 71, as previously explained. The spindle carrying element 72 may then be clamped in adjusted position by tightening the nuts on T-bolts 125 which secure it to the bracket element 122.

As indicated in Fig. 5, the work carrying table 32 is arranged to be driven by means of a table driving electric motor 127 secured to the rear side of the bed 30 and that is connected by means of a driving train 128 to turn a feed screw 129 arranged to move the table along the ways 31 in the usual manner. The driving train 128 includes a transmission mechanism 130 that is arranged to provide for movement of the table in either direction either at a selected feed rate or at rapid traverse rate in well known manner, a suitable trip mechanism being provided for changing the rate of movement, reversing, and stopping the table automatically. Manual control of the rate and direction of movement of the table is provided by a combined feed and rapid traverse selector and reversing lever 131, mounted on the front of the machine bed, as shown in Fig. 2.

Figure 7:
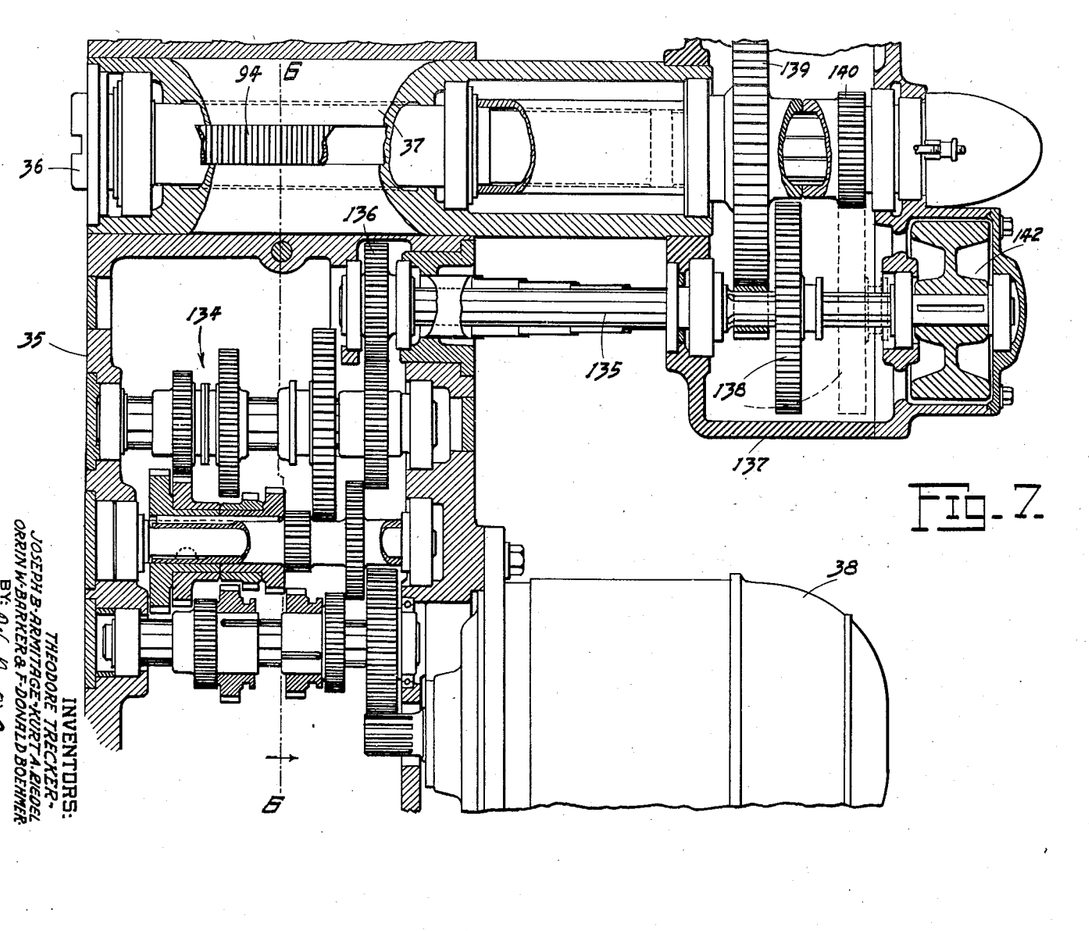
Fig. 7 is another view in vertical section through the spindle head, taken longitudinally of the spindle along the line 7—7 of Fig. 6.

The mechanism for driving the main horizontally disposed spindle 36 is housed within the spindle head 35, as best shown in the sectional views Figs. 6 and 7. As shown in Fig. 7, the main spindle driving motor 38 is directly connected to actuate a spindle speed changing mechanism 134 that is housed within the spindle head 35 and is arranged to be adjusted selectively by turning the adjusting lever 39, in well known manner, the adjusted speed being indicated by the dial 40. From the speed changing mechanism 134, power is transmitted at the selected speed to a secondary shaft 135 that has splined connection with a gear 136 driven by the speed changer, the arrangement being such that the shaft 135 may have axial movement relative to the gear in the speed changer without interfering with the driving connection.

As shown, the shaft 135 is journalled in a housing 137 that is fixed to the rearward end of the axially movable quill 37, the arrangement being such that the housing 137 and the secondary shaft 135 are carried by and move with the quill 37 when it is moved in or out in effecting axial adjustment of the spindle 36. Within the housing 137, the secondary shaft 135 carries a range changing couplet 138 that is slidably mounted thereon for selective engagement with either a large gear wheel 139 or a small gear wheel 140 fixed on the spindle 36, the arrangement being such that the spindle may be actuated from the shaft 135 in either a high speed range or a low speed range by suitably positioning the couplet 138. As shown in Fig. 2, a range changing lever 141 is provided at the front of the housing 137 for shifting the couplet 138 in well known manner. To steady the driving effect upon the spindle 36, the secondary shaft 135 is provided at its outer end with a flywheel 142 which operates at relatively high speed regardless of whether the spindle is being driven in the low speed range or in the high speed range.

The mechanism for driving the vertical spindles 55 is shown in Fig. 13 which is a vertical sectional view through the vertical head. As there shown, the vertical spindle motor 60 is provided with a pinion 145 that meshes with a gear 146 to which is secured a pinion 147. The pinion 147 meshes in turn with a gear 148 fixed on the upper end of a vertically disposed spindle driving shaft 149 journalled in the head 54, the several pinions and gears constituting a speed reducing mechanism for driving the shaft 149 at a lower speed than that at which the motor 60 operates. As shown, the shaft 149 extends downward through the head 54 past the rail 50 and is provided at its lower end beneath the rail with a wide faced spur gear 151 from which the several vertical spindles 55 are driven.

Figure 14:
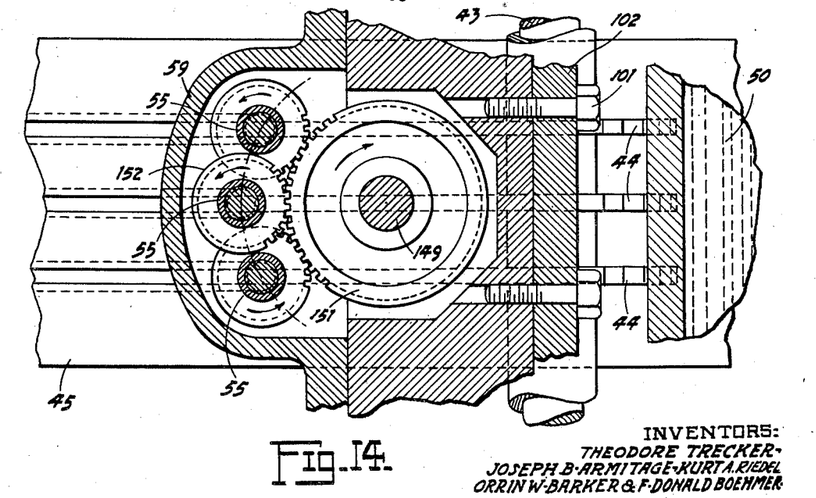
Fig. 14 is an enlarged view in horizontal section of the vertical spindle driving mechanism, taken along the line 14—14 in Fig. 13.

As best shown in Fig. 14 which is a horizontal sectional view, the vertical spindles 55 are arranged in the spindle carrier 59 with their centers on an arc of a circle concentric with the spindle driving shaft 149. This arrangement permits each spindle to be driven directly from the shaft 149 by means of pinions 152 fixed on the several spindles and each meshing directly with the wide faced gear 151. As shown in the drawing, the pinion 152 on the center spindle is raised above and overlies the pinions on the two outside spindles, thereby providing for close spacing of the spindles. Since each of the pinions 152 meshes directly with the gear 151, all of the spindles 55 are caused to rotate in the same direction, as indicated by the arrows in Fig. 14, and at the same speed, the pinions all being of the same diameter. The face of the gear 151 is of sufficient width to permit the overlapped pinions 152 to be moved vertically along it throughout the limited range of adjustment of the spindle carrier 59 as previously referred to.

For operating upon a work piece 45 in which the T-slots are to be formed with a different spacing than that shown in Fig. 14, the spindle carrier 59 is detached from the head 54 by removing the bolts 110 and a substitute head having corresponding spindles arranged at different positions along the circular arc is applied, the arrangement being such that the pinions 152 on the several spindles mesh properly with the gear 151 for any spindle spacing within the range of the machine.

In the case of the side cutting head 64, both the primary spindle 65 and the secondary spindles 67 and 69 are driven from a single side head motor 155. As shown in Fig. 12, the motor 155 is provided with a pinion 156 that meshes with a gear 157 which is mounted on and serves to drive the spindle 67. A second similar gear 158 meshing with the gear 159 is mounted on and serves to drive the second spindle 69.

For turning the primary spindle 65, the power is transmitted from the gear 158 on the spindle 69, to a gear 159 that meshes with it and that carries a bevel gear 160. The bevel gear 160 meshes with a complementary bevel gear 161 on the lower end of a vertical shaft 162 which is disposed parallel with and serves to drive the vertical spindle 65. As shown, the shaft 162 is provided at its upper end with a pinion 163 which has meshing engagement with a gear wheel 164 fixed on the spindle 65, the arrangement being such that the spindle 65 is driven at reduced speed.

In operating the milling machine to form all of the slots in a machine tool table simultaneously, a table blank 45 is lifted by means of a crane 175, shown in Fig. 1, onto the machine table 32 and is clamped in accurately predetermined position by means of the clamping fixture 46. The table 32 may then be moved to the left at rapid traverse rate, by moving the control lever 131 to left rapid traverse position, to bring the work piece into juxtaposition with the gang of cutters 44 on the arbor 43 driven by the main spindle 36. The spindle motors and the table motor may then be energized, if not already in operation, by actuating corresponding push button switches in a control panel 176 at the front of the machine bed, as shown in Fig. 2. The table is then caused to advance at feed rate by moving the control lever 131 to left feed position.

The main spindle 36 is rotated in direction to cause the cutters 44 to effect a primary climb cutting operation upon the table blank 45, the cutters forming preliminary rectangular slots 177 of the desired depth as determined by the vertical adjustment of the spindle head 35 along the upright 33. As may be seen in Fig. 8, as soon as the feeding operation has progressed a short distance, the secondary or T-slot forming cutters 56 enter the preliminary slots 177 and perform successive secondary cuts which complete the T-slots. Since the cutters 44 operate to effect climb cutting, the chips resulting from their operation are deposited in the preliminary slots 177 immediately behind the cutters. To prevent the chips from interfering with the operation of the secondary cutters 56, a power driven chip removing apparatus constituting part of a complete chip disposal system is provided which removes the chips automatically from the preliminary slots between each primary cutter and its following secondary cutter.

Figure 16:
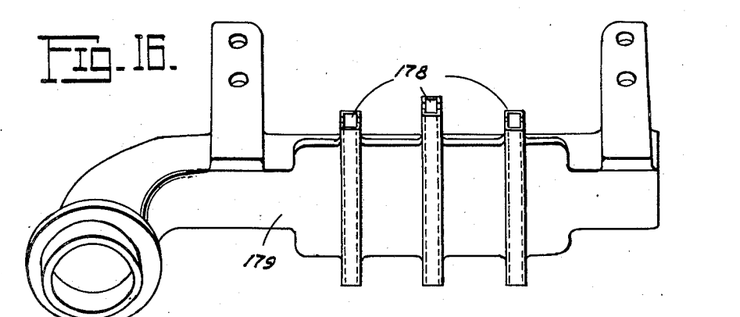
Fig. 16 is an enlarged detailed view of the suction manifold and chip removing nozzles which cooperate with the cutters on the main and vertical spindles, as shown in Fig. 13.

As shown in Fig. 13, the chip removing apparatus includes power driven suction means comprising a series of suction nozzles 178 each of which is arranged to fit the preliminary slot 177 between the cutters and is connected to a suction manifold 179, the manifold and nozzle assembly being shown in its entirety in Fig 16. Each of the nozzles 178 comprises an upper forward body portion 181, Fig. 13, that fits down on the top of the table blank 45 at the sides of the slot and presents an inlet opening somewhat wider than the slot 177 through which chips may be drawn into the manifold 179 without obstruction. A lower portion 182 of the nozzle constitutes a depending shoe which substantially fills the slot 177 and presents an upwardly curved forward edge 183 which functions as a scoop or guide that cooperates with the side walls of the slot 177 to form a suction passageway for picking up chips at the rear of the cutter 44. A conduit 185 is formed in the trailing edge of the nozzle 178 in position to present a suction opening adjacent to the secondary cutter 56 for picking up chips from the zone of operation of this cutter. To assist in dislodging and removing chips from the region of the secondary cutter, an air blast is directed from a compressed air blowing nozzle 186 into the T-slot behind the cutter 56 in direction to blow the chips into the conduit 185. The air currents passing the cutters 44 and 56 in flowing into the nozzle 178 serve to cool the cutters in addition to removing the chips from their zones of operation.

As appears in Fig. 16, the three nozzles 178 for following the three cutters 44 are joined with the manifold 179 to constitute a unitary structure that is secured to the vertical spindle head 54. As shown, the center nozzle extends rearwardly farther than the two end nozzles to take into account the arcuate relationship of the three secondary cutters.

Figure 15:
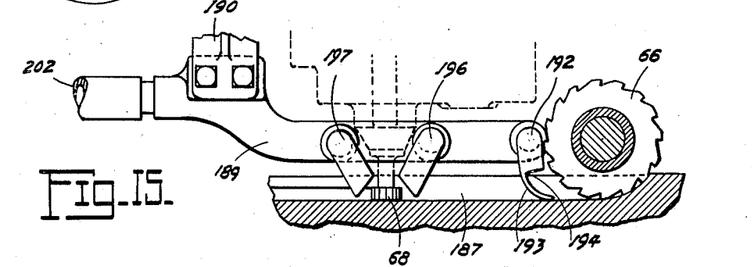
Fig. 15 is an enlarged fragmentary view of the side head cutters and chip removal system, taken along the line 15—15 in Fig. 12.

As the table blank 45 being machined continues to progress through the machine, it next encounters the side slotting cutter 66 which effects a climb cutting operation in the front or apron of the table to form a preliminary slot 187 therein, as shown in Fig. 15. The table then encounters the T-slot cutter 68, indicated in Fig. 8, which performs the secondary cut in the slot 187 to complete the side or trip dog T-slot. As in the case of the cutters for the top slots, the side slot cutters are provided with chip disposal apparatus for removing chips from the path of the secondary cutter 68. As shown in Figs. 3 and 15, this apparatus includes a suction manifold 189 that is secured to the cutter spindle carrier 72 by means of a bracket 190. From the manifold 189 a suction nozzle 192 projects into the preliminary slot 187 behind the side slotting cutter 66. As shown in Fig. 15, the nozzle 192 is provided with a scoop or finger 193 that is curved inwardly to the bottom of the slot 187 and functions to guide chips from the cutter 66 into a suction opening 194 at the front of the nozzle 192, the sides of the slot 187 cooperating with the finger 193 to constitute an extension of the suction passageway. If desired, the cutter 66 may be fitted with a suction nozzle 195 of modified type shown in Fig. 3, that is arranged to encircle the inactive periphery of the cutter and is provided with suction openings at each end for receiving chips both ahead of and behind the cutter. For receiving chips from the region of the T-slot cutter 68, the manifold 189 is provided with a pair of suction nozzles 196 and 197 disposed to project into the slot 187 in front of and in back of the cutter 69 respectively. When two T-slots are being cut in the apron, additional nozzles 198 and 199 are provided at the sides of the second forming cutter 70, and a second suction nozzle 200 is arranged to follow the second slotting cutter 71, as shown in Fig. 12.

As appears in Figs. 3 and 8, the suction manifold 179 associated with the top cutters is connected to a main suction system by a pipe 201, the side head manifold 189 likewise being connected to the pipe 201 by means of a branch suction pipe 202. The main suction pipe 201 turns upward as shown in Fig. 1, and is provided with branch connections 203 and 204 constituting additional suction lines to which vacuum hoses may be attached for general cleaning about the machine.

The suction pipe 201 discharges into the top of a chip bin 206 which collects the chips withdrawn from the region of the cutters, a door 207 being provided in the bottom of the bin for the purpose of removing accumulated chips. Dust laden air is drawn from the top of the bin 206 through a pipe 208 that leads into a dust collecting unit 209 likewise provided at the bottom with a door 210 for removing dust that accumulates therein. From the dust collector 209, clean air is drawn through a pipe 211 by a suction fan 212 driven by a directly connected electric motor 213, the air being returned to the atmosphere through a discharge pipe 214.

Figures 9, 10, 11:
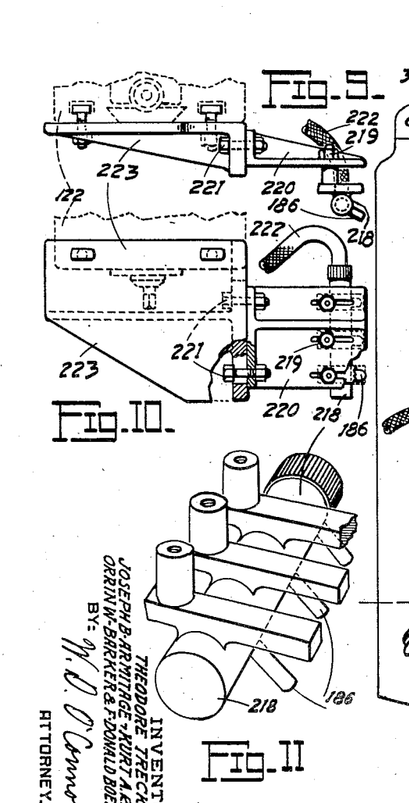
Fig. 9 is a fragmentary detailed view of a supporting bracket carrying a blowing nozzle for blowing chips from the cutters of the vertical spindle head.
Fig. 10 is a fragmentary plan view of the nozzle and the supporting bracket.
Fig. 11 is an enlarged view in perspective of the blowing nozzle.

The air jet nozzles 186 which cooperate with the suction nozzles 178 are formed on a manifold 218, as best shown in Fig. 11. As shown in Figs. 9 and 10, the manifold 218 is adjustably mounted by means of stud bolts 219 on a slotted supporting bracket 220 in a manner to be moved toward or from the cutters 56. The bracket 220 is in turn adjustably mounted by bolts 221 on a bracket 223 that is secured to the inverted bracket 122 constituting the fixed portion of the side head 64. Compressed air for the nozzles is supplied to the manifold 218 from a suitable source through an air line 222.

To protect the ways 31 from dust which may settle upon them, they are preferably covered by flexible strips constituting way guards, which are described and claimed in copending application Serial No. 497,034 filed August 2, 1943, which issued March 18, 1947, as Patent No. 2,417,671.

The electric motor 213 for driving the chip removing suction fan 212 is electrically interlocked with the table driving motor 127 by means of an interlocking control system in such manner that the table 32 cannot be actuated at feed rate unless the chip removing motor is energized, the arrangement being such, furthermore, that the table motor 127 will be stopped automatically in the event of an overload on the suction motor 213.

Figure 17:
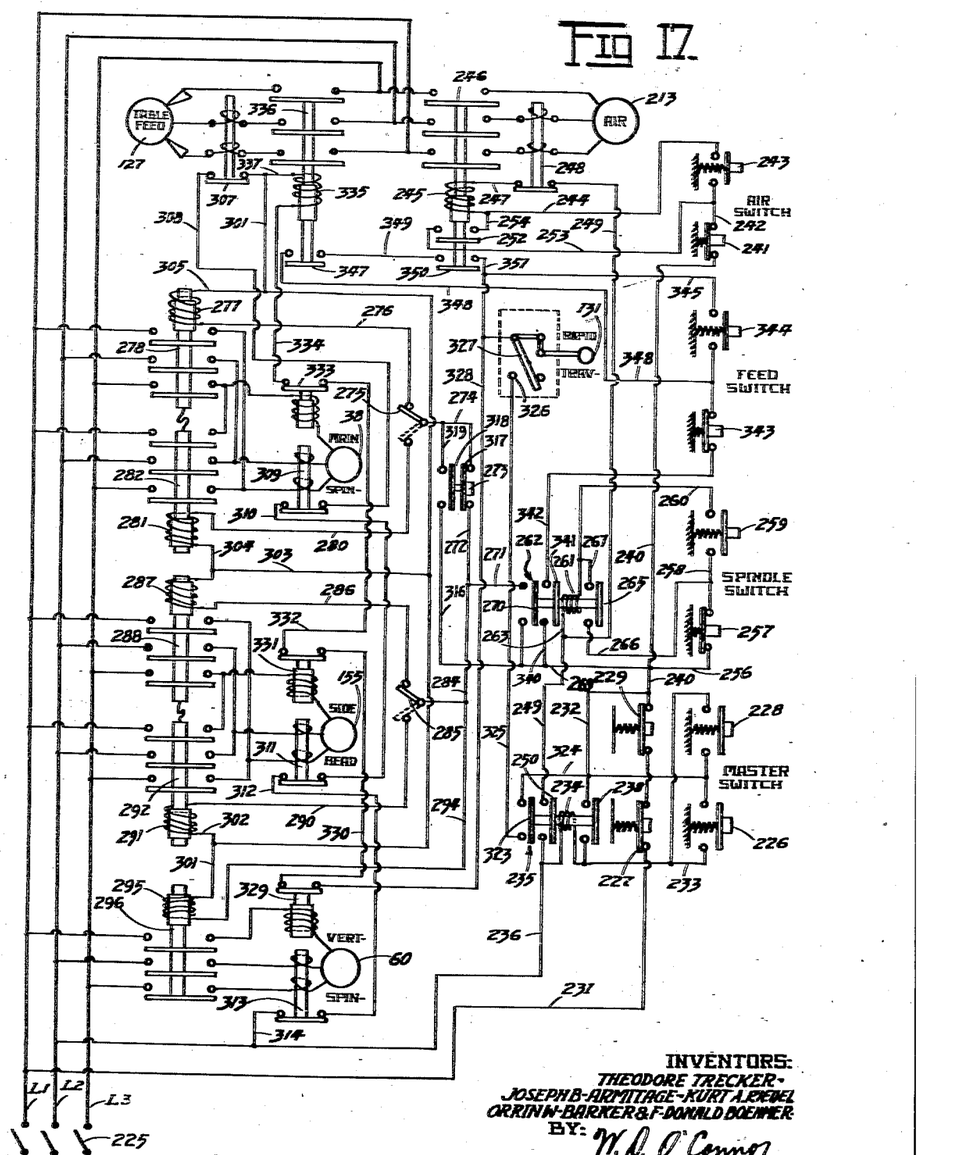
Fig. 17 is an electrical circuit diagram showing the inter-relationship of the several motors for driving the various elements of the machine.

Electric energy for operating the table motor, the various spindle motors, and the chip removing motor is derived from line conductors L1, L2 and L3, as indicated in the circuit diagram Fig. 17, the line conductors being connected to a source of power by means of a disconnecting switch 225 in the usual manner.

In order to operate any of the motors, it is first necessary to energize a control circuit by means of which independent electrically operated switches associated with the various motors may be actuated. The control circuit is governed by a master start button 226 and a master stop button 227, which are mounted in the control panel 176 on the front of the machine bed, a similar master start button 228 and corresponding stop button 229 being mounted in an auxiliary panel at the back of the machine bed.

To energize the control circuit, either one of the normally open master start buttons 226 or 228 may be closed, thereby completing a master control circuit which extends from the line conductor L1 through a conductor 231, the normally closed master stop switches 227 and 229 in series circuit relationship, a conductor 232 leading to the master starting push buttons, and thence through the closed starting push button and a conductor 233 to an actuating solenoid 234 of a master relay 235, the solenoid being connected by a return conductor 236 to the line conductor L2. When the master relay 235 is thus closed by energizing the solenoid 234, a holding circuit is established from the line conductor L1 through the conductor 231, the stop switches 227 and 229, and the conductor 232, from which a closed contact 238 of the master relay 235 establishes a shunt connection directly with the conductor 233, thus completing the circuit through the solenoid 234 and the return conductor 236 to the line conductor L2, whereby the master relay 235 will remain closed after the master starting button has been released. To stop all of the motors of the machine instantly from a position at either side of the machine, it is merely necessary to press one or the other of the master stop push buttons 227 and 229, thereby opening the holding circuit and deenergizing the solenoid 234 to permit the master relay to move to open position.

With the master relay 235 in closed position, a control circuit for the suction fan motor 213 is established from the line conductor L1 through the conductor 231, the closed master stop buttons 227 and 229, and a conductor 240 which leads to a normally closed stop push button 241 and thence through a conductor 242 to a normally open start push button 243, the buttons being mounted in the control panel 176 at the front of the machine beside the master start and stop buttons 226 and 227. When the suction motor starting push button 243 is closed, the circuit is completed through it and a conductor 244 to a solenoid 245 of an electrically actuated motor switch 246 associated with the suction motor 213. From the solenoid 245, a conduit 247 leads to a thermally responsive overload relay 248 associated with the motor 213 from which a return conductor 249 leads to a closed contact element 250 of the master relay 235 which connects with the return conductor 236 leading to the line conductor L2.

With the motor switch 246 closed, the motor 213 is connected to the line conductors L1, L2 and L3 and is thereby energized to operate the suction fan 212. Likewise, an auxiliary contact element 252 on the switch 246 is closed to constitute a shunt around the starting push button 243 to establish a holding circuit which extends from the conductor 242 through a conductor 253, the contact 252 and a conductor 254 to the solenoid 245, whereby the solenoid remains energized after the push button 243 is released. The suction fan motor 213 may be stopped by opening the stop push button 241 thereby breaking the holding circuit and permitting the motor switch 246 to move to open position.

A single control circuit is provided for starting and stopping the three spindle driving motors. The spindle motor control circuit likewise originates at the line conductor L1 and follows the conductor 231 leading therefrom through the push button switches 227 and 229 to the conductor 240 from which a conductor 256 leads to a normally closed spindle motor stop button 257 and thence by a conductor 258, to a normally open start push button 259, these buttons likewise being mounted in the panel 176 at the front of the machine. From the push button 259 the circuit continues through a conductor 260 to a solenoid 261 of a spindle motor relay 262, from which a conductor 263 leads to the conductor 249 and the closed contactor 250 of the master relay 235 which connects with the return conductor 236 leading to the line conductor L2.

When the spindle motor relay 262 closes, a contactor 265 thereon establishes a holding circuit in shunt with the spindle starting push button 259, the circuit extending from the conductor 258 through a conductor 266, the closed contactor 265, and a conductor 267 which leads to the conductor 260 that connects with the solenoid 261, thereby maintaining the solenoid energized after the push button switch 259 is released. The spindle motor relay 262 may be opened to stop all of the spindle motors by pressing the stop button 257, thereby breaking the holding circuit through the solenoid 261.

With the spindle motor relay 262 closed, an energizing control circuit for the spindle motors is established from the line conductor L1 through conductor 231, the closed master stop buttons 227 and 229, the conductor 240, and a conductor 269 that leads to a closed contactor 270 of the spindle motor relay. From the closed contactor 270, a conductor 271 leads to branch conductors extending to each of the three spindle motors whereby all three motors may be controlled simultaneously. For controlling the main spindle motor, a branch conductor 272 leads from the conductor 271 to an inching switch 273 from which a conductor 274 leads to a reversing switch 275.

With the reversing switch 275 in its upper closed position, as indicated in full lines in the diagram, the circuit is continued through a conductor 276 that leads to an actuating solenoid 277, which when energized, closes a forward main spindle motor switch 278 that functions to energize the main spindle motor 38 from the line conductors L1, L2 and L3 for operation in a forward direction. If the reversing switch 275 is moved to the lower position, indicated in dotted lines in the diagram, the circuit continues through a conductor 280 which leads to a solenoid 281 of a reverse main spindle motor switch 282 which is then closed to cause operation of the main spindle motor in reverse direction.

For controlling the side-head motor 155, the circuit from the spindle motor relay 262 leads through the common conductor 271 and a branch conductor 284 to a reversing switch 285. With the reversing switch 285 in its upper position as shown in full lines, the circuit continues through a conductor 286 to a solenoid 287 of a forward side-head spindle motor switch 288 which, when thereby closed, energizes the side-head motor 155 for operation in a forward direction. If the switch 285 is turned to the lower position, as shown in dotted lines, the circuit continues through a conductor 290 which leads to a solenoid 291 that functions, when energized, to close a reverse side-head motor switch 292, thereby energizing the side-head motor 155 to operate in reverse direction.

The branch control circuit for the vertical spindle motor 60 likewise flows from the spindle motor relay 262 through the common conductor 271, the branch conductor 284, and a branch conductor 294 leading directly to a solenoid 295 of a motor switch 296 which, when closed thereby, energizes the vertical spindle motor 60 from the main line conductors L1, L2 and L3 to operate in a predetermined direction, no provision being required in this instance for effecting reversal in the direction of rotation.

From the solenoid 295 of the vertical spindle motor switch 296, the circuit continues through a return conductor 301 which constitutes a common return for all of the spindle motor switch solenoids, the solenoids 291 and 287 of the side-head motor switches being connected to it by conductors 302 and 303 respectively, while the solenoids 281 and 277 of the main spindle motor switches are connected to it respectively by a conductor 304 leading to the conductor 303, and by a conductor 305. The common return conductor 301 is connected to a thermally responsive overload relay 307 associated with the table driving motor 127. From the relay 307, a conductor 308 leads to a thermally responsive relay 309 associated with the main spindle motor 38, and a conductor 310 leads from the relay 309 to a thermally responsive relay 311 associated with the side-head motor 155. From the relay 311, a conductor 312 leads to a thermally responsive relay 313 that is associated with the vertical spindle motor 60, from which a conductor 314 leads to the conductor 236 that returns to the line conductor L2. The several thermally responsive relays associated respectively with the table driving motor 127 and the three spindle driving motors 38, 155 and 60 being all connected in series circuit relationship, it follows that upon an overload condition occurring in any one of these motors, the common return circuit will be broken and all of the motor switch solenoids de-energized thereby stopping the table motor and all of the spindle motors.

The inching push button switch 273 previously referred to in the branch control circuit to the main spindle motor switches, is for the purpose of jogging or inching the main spindle motor 38 to turn the main spindle transmission speed changing mechanism 134 slightly, to facilitate adjustment thereof by the speed changing lever 39. In order that the jogging action may be effected independently of the spindle motor relay 262, the inching switch 273 is arranged to effect a shunt connection around the spindle relay. As shown in the circuit diagram, the inching circuit extends from the line conductor L1 through the conductor 231, the master stop push button stop switches 227 and 229, the conductor 240, the conductor 269, and a conductor 316 which leads to the inching switch 273. When the inching switch button 273 is depressed, a contactor 317 thereof opens the normal control circuit from the spindle motor relay 262 to the main spindle motor switches, while a second contactor 318 closes the shunt circuit from the conductor 316 through a conductor 319 leading to the spindle motor reversing switch 275. The circuit thus established flows through one or the other of the main spindle motor switch solenoids 277 and 281, depending upon the position of the reversing switch 275, thereby causing the motor to be energized during the period that the inching button is held in depressed position. By reason of the fact that the contactor 317 opens the normal control circuit, current from the shunt circuit is prevented from flowing to the solenoids of the other spindle motor switches.

Although the table driving motor 127 is interlocked electrically with the other motors when operating to drive the table at feed rate, as previously explained, provision is made for energizing the table motor independently to move the table at rapid traverse rate, for the purpose of setting up work or the like, regardless of whether or not any of the other motors are energized. To this end, the master relay 235 is provided with a contactor 323 which, when the master relay is closed, establishes an independent control circuit for operation of the motor to move the table at rapid traverse rate. As shown in the circuit diagram, this circuit leads from the line conductor L1 through the conductor 231, the master stop push button stop switches 227 and 229, the conductor 232 and a conductor 324 leading to the contactor 323. From the contactor 323 a conductor 325 leads to a contactor 326 of a switch 327 associated with the rapid traverse control lever 131. When the lever 131 is moved to rapid traverse position, the switch 327 is moved into engagement with the contactor 326 thereby completing the table motor control circuit and starting the motor regardless of the condition of any of the other motors.

From the rapid traverse switch 327, the circuit leads through a conductor 328 that connects with an instantaneous overload relay 329 associated with the vertical spindle motor 60. The relay 329 is connected by a conductor 330 to an instantaneous overload relay 331 associated with the side-head motor 155 and that is connected in turn by a conductor 332 with an instantaneous overload relay 333 associated with the main spindle motor 38. From the overload relay 333, a conductor 334 leads to a solenoid 335 that is arranged upon energization to close a table motor switch 336 which functions to connect the table motor to the line conductors L1, L2 and L3, thereby energizing it. From the solenoid 335, a return conductor 337 leads to the thermal overload relay 307 associated with the table motor 127 from which the return circuit flows through the thermal overload relays associated with the three spindle motors in series as previously explained, and thence to the line conductor L2. If the table driving motor 127 is thus energized by closing the rapid traverse switch during a time that the other motors are not operating, the table motor will continue to operate only so long as the rapid traverse lever 131 is held in rapid traverse position, the control circuit being broken by the switch 327 when the lever is returned to feed position.

With the rate and direction controlling lever 131 in feed position, the table driving motor 127 can be started to effect feeding movement of the table 32, only after the master control relay has been closed and both the suction fan motor 213 and the spindle driving motors have been energized. The control circuit for starting the table motor 127 to operate at feed rate, extends from the line conductor L1 through the conductor 231, the closed master push button stop switches 227 and 229, and thence through the conductor 240, the conductor 269 and a conductor 340 which leads to a closed contactor 341 of the spindle motor relay 262. With the spindle motors energized and the relay contactor 341 closed, the circuit continues through a conductor 342 to a normally closed table motor push button stop switch 343 and thence to a normally open table motor push button starting switch 344. With the starting push button 344 held closed, the circuit continues through a conductor 345 to the conductor 326 which establishes a connection, as previously explained, through the instantaneous overload relays of the three spindle motors, in series circuit relationship, and thence by the conductor 334, to the solenoid 335 of the table driving motor switch 336. From the solenoid 335, the circuit is connected to return through the thermally responsive overload relay of the table driving motor and the three thermally responsive overload relays of the spindle driving motors, in series circuit relationship, to the line conductor L2, as previously explained.

When the table motor switch 336 closes, an auxiliary contactor 347 thereon closes and establishes a holding circuit in shunt relationship with the starting push button 344. As shown, the holding circuit extends from the normally closed stop push button 343 through a conductor 348, the closed contactor 347 of the table motor switch, and a conductor 349 that leads to an auxiliary contactor 350 of the suction fan motor switch 246. With the suction fan motor 213 operating prerequisite to a table feeding movement, the contactor 350 is closed thereby completing the control circuit through a conductor 351 to the conductor 326, the arrangement being such that should the suction fan motor switch 246 be opened either by its control push button or by reason of an overload in the motor, the holding circuit for the table motor switch 336 will be broken, thereby stopping the table motor.

Furthermore, should an instantaneous overload occur in any one of the spindle driving motors, the return circuit will be broken and the table motor switch opened. Preferably, the table motor is provided with an automatic brake to effect instantaneous stopping of the feeding movement upon deenergization of the table motor switch solenoid 335. Also, the table motor will be stopped upon the occurrence of a continuing overload either in the table motor itself or in any one of the three spindle driving motors, by reason of the corresponding thermally responsive relay opening the control circuit as previously explained. In addition, the table motor will be stopped upon depressing the spindle motor stop button 257, since the control circuit leads through the spindle motor relay 262, thereby preventing continuing operation of the table feed after the spindle motors have been stopped.

As in the case of the other motors, the table motor 127 may be stopped independently by depressing its normally closed push button stop switch 343 which also breaks the holding circuit. As previously mentioned, the table motor, together with all of the other motors, will stop upon depressing either of the master stop push button switches 227 and 229, whereby operation of the entire machine may be stopped simultaneously as may be necessary in an emergency.

The various motor switches and other control apparatus shown diagrammatically in Fig. 17 are preferably housed in a compartment formed in the rear upright 33 and made accessible by opening a hinged door 353, shown in Fig. 4.

From the foregoing description of, and explanation of the operation of, the milling machine herein set forth to exemplify the present invention, it should be apparent that there has been provided an improved machine tool structure especially adapted to perform a multiplicity of machining operations upon a work piece simultaneously with a high degree of efficiency and without danger of injury to the machine or to the work piece through inadvertent operation of the various machine elements in improper sequence.

Although the illustrative embodiment of the invention has been described in considerable detail for the purpose of setting forth an operative and practical exemplifying structure, it is to be understood that the particular apparatus and control system herein described, are intended to be illustrative only and that various characteristics of the invention may be incorporated in other structural forms without departing from the spirit and scope of the invention as defined in the subjoined claims.

The principles of the invention having now been fully explained in the foregoing written description of an illustrative embodying machine, we hereby claim as our invention:

1. A milling machine, comprising a work support, a plurality of cutter spindles cooperatively associated with said work support, transmission mechanism arranged to effect relative movement between said work support and said cutter spindles selectively at feed rate or at rapid traverse rate, an electric motor operatively connected to drive said transmission mechanism, electric motors operatively connected to drive different of said cutter spindles, power driven means disposed to remove chips resulting from operation of said milling machine, an electric motor operatively connected to drive said chip removing means, a control system for coordinating the operation of said motors, said control system including an interlock arranged to prevent operation of said feeding motor for effecting relative movement at feed rate unless said spindle motors and said chip removing motor are operating, a switch arranged to effect energization of said feeding motor when said transmission mechanism is adjusted to effect relative movement at rapid traverse rate regardless of whether or not said spindle and chip removing motors are operating, an interlock arranged to stop said feeding motor instantaneously upon the sudden occurrence of an overload condition in any one of said spindle motors, an interlock arranged to stop said feeding motor and all of said spindle motors upon the occurrence of a continuing overload in any one of said feeding or spindle motors, and an interlock arranged to stop said feeding motor and said chip removing motor upon the occurrence of an overload in said chip removing motor.

2. In a machine tool, a work supporting structure, a primary cutter disposed to effect a first climb cutting operation on a work piece carried by said supporting structure, power driven feeding means arranged to effect relative feeding movement between said work supporting structure and said cutter in effecting said cutting operation, a secondary cutter disposed to follow in the slot formed by said primary cutter in the direction of the feeding movement to effect a successive cutting operation upon the work piece, power driven means arranged to remove from the region between said cutters chips resulting from the first cutting operation, and an interlocking control system arranged to prevent operation of said power feeding means except when said power driven chip removing means is operating, whereby danger of overloading said cutters by an excessive accumulation of chips is obviated.

3. A milling machine for milling slots, comprising a first milling cutter disposed to take a preliminary slotting climb cut in a work piece whereby resulting chips are deposited in the slot behind said cutter, a second milling cutter disposed to take a secondary cut in the slot formed by said first cutter, a suction nozzle arranged to engage said slot between said cutters, and suction means connected with said nozzle and operative to withdraw from said slot chips resulting from said cutting operations to clear the path in advance of said second milling cutter.

4. In a milling machine arranged for effecting successive cuts, a work supporting structure, a milling cutter disposed to effect a preliminary climb cutting operation upon a work piece carried by said supporting structure whereby resulting chips are disposed on the cut surface, power driven means arranged to effect relative feeding movement between said work supporting structure and said cutter in effecting a cutting operation, a second milling cutter arranged to effect a secondary cutting operation along the same path in the feeding movement, a chip removing suction nozzle disposed between said cutters and operative to remove chips resulting from the cutting operations to clear the path for said second milling cutter, power driven suction means associated with said suction nozzle for withdrawing said chips, and an interlocking control system arranged to prevent operation of said power driven feeding means unless said power driven suction means is operating.

5. In a machine tool, a cutter supporting structure, a work supporting table arranged for movement relative to said cutter supporting structure, a motor operatively arranged to effect feeding movement between said work supporting table and said cutter supporting structure, primary and secondary cutters arranged on said cutter supporting structure in tandem relationship for performing successive operations upon a work piece on said work supporting table, said primary cutter operating to dispose chips in the path of operation of said secondary cutter, power driven apparatus arranged to remove chips from between said primary and said secondary cutters to prevent jamming of said cutters, and a control system interlocking said feeding motor and said power driven chip removing apparatus in manner to cause said feeding motor to stop in the event said chip removing apparatus should stop during a machining operation.

6. A milling machine arranged to take simultaneous successive cuts upon a work piece, comprising a primary cutter disposed to effect a climb cutting operation upon the work piece, a secondary cutter spaced from said primary cutter in the direction of the feeding movement and disposed to effect a successive cutting operation upon the work piece, a suction nozzle positioned between said cutters and operative to remove chips resulting from said cutting operations, and a blowing nozzle arranged to blow chips from said secondary cutter toward said suction nozzle, the arrangement being such that danger of jamming said secondary cutter by chips from said cutting operation is obviated.

7. In a milling machine including a base, a work support movably mounted on said base, a column upstanding from said base at each side of said work support, a spindle carrying head slidably mounted for vertical movement along one of said upstanding columns, a primary tool carrying spindle rotatably mounted in said spindle head in cooperating relationship with said work support, a horizontally disposed rail structure attached to said spindle head and bodily movable therewith, a saddle slidably mounted for vertical movement along the other of said columns and connected to said rail for cooperating in supporting it, an auxiliary spindle carrying head slidably mounted for horizontal movement along said rail, a secondary tool carrying spindle mounted in said auxiliary head and cooperating with said work support, a primary cutter carried by said primary spindle in position to mill a slot in a work piece mounted on said work support, a secondary cutter carried by said secondary spindle in position to operate in tandem relationship with said primary cutter to operate within the slot in the work piece, a chip removing nozzle for cleaning chips from between said cutters, said nozzle having a body portion engaging the surface of the work piece at the sides of the slot and presenting a suction opening wider than the slot, a suction system connected with said nozzle for withdrawing chips therethrough, an electric motor operatively connected to drive said chip removing suction system, another electric motor operatively connected to effect relative feeding movement between said work support and said cutters in performing a cutting operation, and an interlocking electrical control system associated with said motors and arranged to stop said feeding motor if said suction system motor ceases operating, thereby preventing jamming of said cutters by accumulating chips.

8. In a milling machine including a base and an associated work support, a column upstanding from said base adjacent to said work support, a spindle carrying head slidably mounted for vertical movement along said upstanding column, a main tool carrying spindle rotatably mounted in said spindle head in cooperating relationship with said work support, a horizontally disposed rail structure attached to said head for bodily movement therewith, an auxiliary spindle carrying head slidably mounted for horizontal movement along said rail, an auxiliary tool carrying spindle rotatably mounted in said auxiliary head in cooperating relationship with said work support, a primary cutter carried by said main spindle, a secondary cutter carried by said auxiliary spindle in tandem relationship with said primary cutter, said primary cutter operating to dispose chips in the path of operation of said secondary cutter, power operated apparatus arranged to remove chips from between said cutters to prevent jamming of said secondary cutter, and control means operative to stop said machine upon the stopping of said power operated chip removing apparatus during a cutting operation.

9. In a combined machine tool, a bed, a work carrying table movably mounted on said bed, an upright carried by said bed at one side of said table, a spindle head slidably mounted for vertical movement along said upright, a second upright carried by said bed at the other side of said table, a cross rail fixed at one end to said spindle head and slidably mounted at its other end upon said second upright, an auxiliary spindle head movably mounted on said cross rail, spindles carried by each of said heads and arranged to operate cutters in tandem relationship in forming a slot in a work piece supported by said table, a suction nozzle disposed to fit over said slot between said tandem spindles for removing chips therefrom, a suction system operatively connected to said nozzle and functioning to withdraw chips through said nozzle from said slot, individual motors operatively connected to drive said table said spindles and said suction system, and a control system arranged to interconnect said motors and operative to stop said table driving motor in the event said suction system motor stops, to prevent accumulation of chips in the region of the cutters operated by said spindles.

10. A milling machine for forming a T-slot, said machine having a plurality of spindles and a work table, a milling cutter carried by one of said spindles and operating by climb cutting to form one portion of a T slot in a workpiece carried by said table, a second cutter carried by another of said spindles and operating in the slot so formed, a motor operatively connected to said spindles to effect said cutting operations, a motor operated chip removing means disposed between said two cutters, and motor interlocking means arranged to prevent said cutting operations unless said motor operated chip removing means is operating.

THEODORE TRECKER.
JOSEPH B. ARMITAGE.
ORRIN W. BARKER.
KURT A. RIEDEL.
F. DONALD BOEHMER.

REFERENCES CITED

The following references are of record in the file of this patent:

UNITED STATES PATENTS

| Number | Name | Date |
|---|---|---|
| 2,224,257 | Eisele | Dec 10, 1940 |
| 2,200,628 | Lofstedt | May 14, 1940 |
| 1,898,732 | Krohne | Feb. 21, 1933 |
| 2,064,172 | Lofstedt | Dec. 15, 1936 |
| 2,251,015 | Gallimore | July 29, 1941 |
| 1,540,809 | Sears | June 9, 1925 |
| 765,447 | Van Norman | July 19, 1904 |
| 704,134 | Smith et al. | July 8, 1902 |
| 963,904 | Lang | July 12, 1910 |
| 2,256,558 | Harder | Sept. 23, 1941 |
| 1,825,684 | Trosch | Oct. 6, 1931 |
| 1,326,863 | Heinkel | Dec. 30, 1919 |
| 2,118,410 | Lofstedt | May 24, 1938 |
| 1,307,749 | Parsons | June 24, 1919 |
| 1,446,854 | Marshall | Feb. 27, 1923 |
| 884,243 | Wahlstrom | Apr. 7, 1908 |
| 1,651,894 | Kent | Dec. 6, 1927 |
| 2,034,221 | Armitage | Mar. 17, 1936 |
| 2,115,058 | Armitage | Apr. 26, 1938 |
| 2,017,913 | Marsilius | Oct. 22, 1935 |
| 1,738,759 | Claybourn | Dec. 10, 1929 |
| 1,658,242 | Hunter | Feb. 7, 1928 |
| 1,913,975 | Coe | June 13, 1933 |
| 2,270,861 | Anderson | Jan. 27, 1942 |
| 2,170,502 | Martellotti | Aug. 22, 1939 |
| 2,240,765 | Dryer | May 6, 1941 |